United States Patent [19]

Meyn

[11] Patent Number: 4,958,408
[45] Date of Patent: Sep. 25, 1990

[54] DEVICE FOR REMOVING THE CRAW OF SLAUGHTERED POULTRY

[76] Inventor: Cosnelis Meyn, Haal 62, 1511 As Oostzaan, Netherlands

[21] Appl. No.: 377,899

[22] Filed: Jul. 10, 1989

[30] Foreign Application Priority Data

Aug. 8, 1988 [NL] Netherlands ............... 8801970

[51] Int. Cl.⁵ .............................. A22C 21/00
[52] U.S. Cl. ....................................... 17/11
[58] Field of Search ........................ 17/11, 45

[56] References Cited

U.S. PATENT DOCUMENTS

| | | | |
|---|---|---|---|
| 2,427,840 | 9/1947 | Davis | 17/11 |
| 2,512,290 | 6/1950 | Spang | 17/11 |
| 4,208,764 | 6/1980 | Loth et al. | 17/11 |
| 4,610,050 | 9/1986 | Tieleman et al. | 17/11 |
| 4,704,768 | 11/1987 | Hutting et al. | 17/11 |

*Primary Examiner*—Willis Little
*Attorney, Agent, or Firm*—Quirk, Tratos & Roethel

[57] ABSTRACT

A device for removing the craw of a slaughtered poultry comprises a mandrel carrying on its circumference projections with blunt outer ends. The projections extend in the direction of rotation and the direction of motion of the mandrel and define the outer limitation thereof.

20 Claims, 2 Drawing Sheets

DEVICE FOR REMOVING THE CRAW OF SLAUGHTERED POULTRY

BACKGROUND OF THE INVENTION

The invention relates to a device for removing the craw of slaughtered poultry, especially turkeys, comprising a rotatable mandrel adapted to be moved via the opening the the belly through the neck of the poultry, and has projections positioned thereon extending in the direction of rotation and the direction of motion of the mandrel.

Such a device is known in European Patent Application No. 178.825. With this known device, the projections include one or a number of series of tongues axially positioned behind each other, the points of which tongues are situated on or inside a cylindrical surface extending through a foremost blunt outer end of the mandrel.

With turkeys, the craw is deeply sunk in the skin, so that it is not possible with the known device to catch the craw. Further, it appears that the sharp outer ends of the tongues of this known device lead to serious damage of the neck of the turkey.

SUMMARY OF THE INVENTION

It is an object of the invention to provide a device of the present type not having said disadvantages.

Therefore, the device according to the invention is characterized in that each projection is provided with a blunt outer end defining the outer limitation of the device.

Because the projections are provided with a blunt outer end, damage to the neck of the turkey is prevented; however, as a consequence of the fact that the blunt outer ends define the outer limitation of the device, the craw sunk deeply in the skin is caught in an effective manner. In this respect it is important that the craw of turkeys is deeply sunk in the skin, however, it is not firmly attached, so that projections provided with a blunt outer end exercise enough force to loosen the craw.

In a preferred embodiment of the device according to the invention, the outer end of each projection is rounded or ball-shaped. In practice, it appears that herewith an optimal compromise is obtained between the strength by which the craw is caught and the avoiding of damage of the neck.

According to another preferred embodiment, each projection tapers from its junction with the mandrel towards its transition to the blunt outer end. In this manner, between the mandrel and the blunt outer end close to the latter, a rather wide clearance is obtained between the projections, between which the craw can be received and from which the craw, after the mandrel has left the neck stub of the poultry in a known manner, can be removed by means of a brush means or the like.

According to an advantageous embodiment of the device, the projections are positioned in axial series disposed along the circumference of the mandrel. In particular, the device is very effective when there are three axial series and when each axial series comprises three projections.

The mandrel can have several constructive designs; so it is possible that the mandrel is cylindrically shaped having a blunt rounded foremost end. According to another embodiment, the mandrel comprises three axially extending projections, at mutual angles of 120° enclosing plates positioned in a star-shaped manner and rounded at the foremost end of the mandrel.

BRIEF DESCRIPTION OF THE DRAWINGS

The invention will hereafter be illustrated with reference to the drawings in which several embodiments of the device according to the invention are shown.

DETAILED DESCRIPTION OF THE INVENTION

Figure 2:
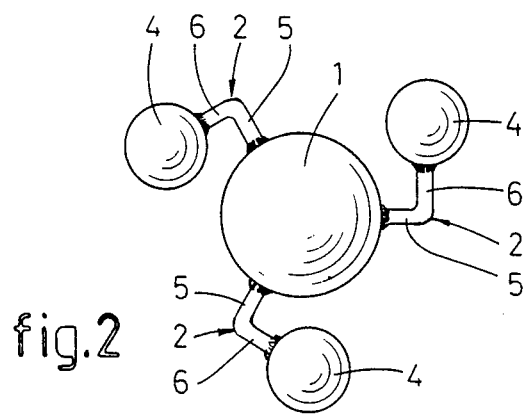
FIG. 2 shows a top view of the invention according to FIG. 1.
Figure 1:
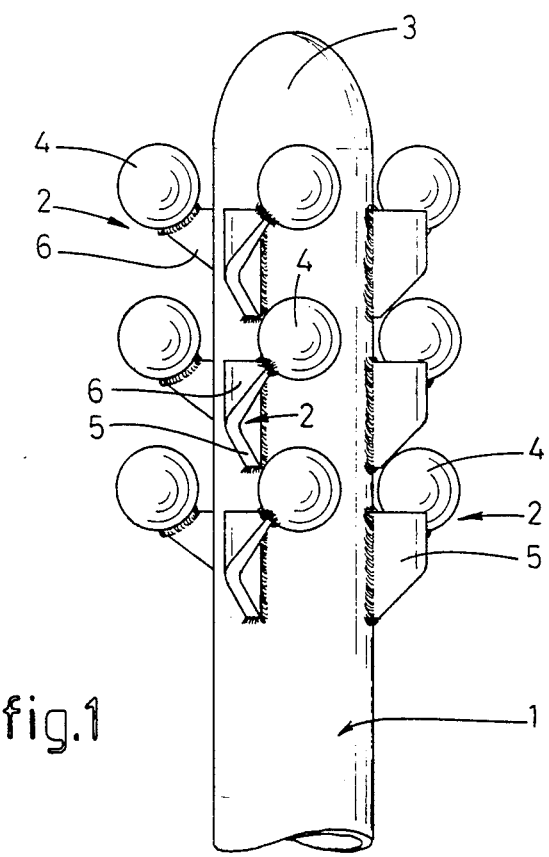
FIG. 1 shows a side view of the active part of a first embodiment of the device according to the invention.

The device for removing the craw of slaughtered poultry, especially turkeys, shown in FIGS. 1 and 2 comprises a mandrel 1 and a number of projections 2 positioned thereon. The mandrel 1 is cylindrically shaped and has a blunt rounded foremost end 3.

The projections 2 are each provided with a rounded ball-shaped blunt outer end 4, which outer ends 4 together define the outer limitation of the device. Each projeciton 2 comprises an inner section 5 extending substantially radially and adjoining thereto an outer section 6 carrying the blunt outer end 4 and extending substantially tangentially. As appears from an accurate study of FIG. 1, each projection 2 tapers from its junction with the mandrel 1 towards its transition to the blunt outer end 4.

Further, the projections 2 are regularly disposed along the circumference of the mandrel 1; in particular, in both embodiments shown, the projections 2 are positioned in three axial series of each three projections 2 disposed along the circumference of the mandrel 1.

Figure 4:
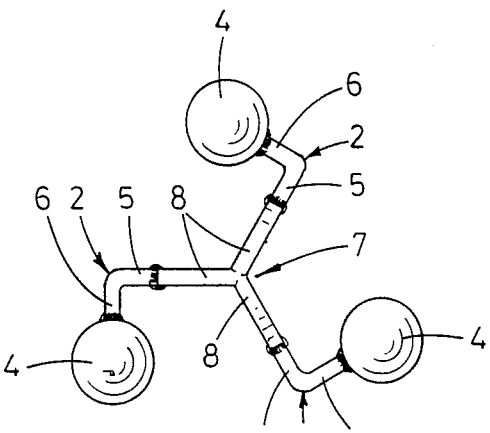
FIG. 4 shows a top view of the device according to FIG. 3.
Figure 3:
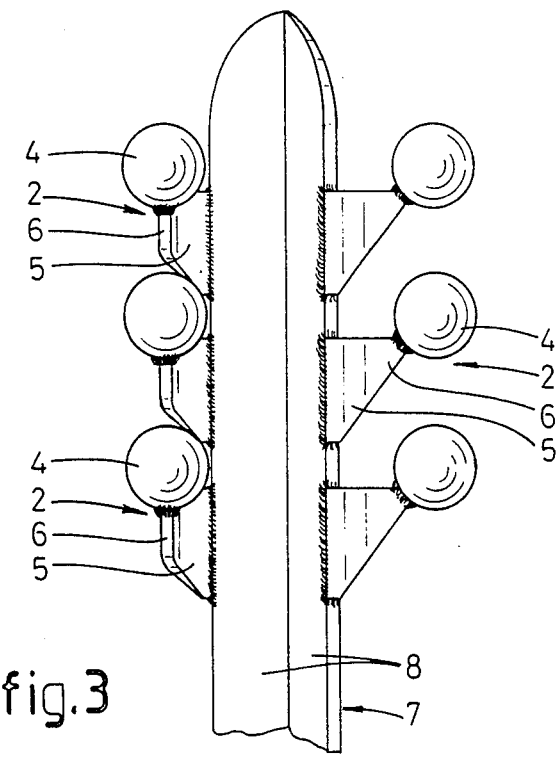
FIG. 3 shows a side view of the active part of a second embodiment of the device according to the invention.

According to the embodiment of the FIGS. 3 and 4, the cylindrical mandrel of FIG. 1 is replaced by a mandrel 7, which comprises three axially extending projections, at mutual angles of 120°, comprising enclosing plates 8 positioned in a star-shaped manner and rounded at the foremost end of the mandrel 7. Again, the projections comprise an inner section 5, an outer section 6 and the ball-shaped blunt outer end 4.

During the use of the device, the mandrel 1 or 7, respectively, with the projections 2 enters through the opening in the belly of the slaughtered poultry and move through the neck of the poultry. During this axial motion, the mandrel is at the same time rotated, the direction of rotation being such that the projections 2 are substantially directed in this direction of rotation; therefore, the direction of rotation of the mandrel, as seen in FIG. 2 and FIG. 4, is counterclockwise. Because the blunt outer ends 4 are axially positioned slightly ahead of the outermost end 6, the projections are substantially directed in the direction of motion of the mandrel 1 or 7, respectively. In this way, an effective operation of the projections is stimulated.

Apart of the embodiments of the mandrel and the projections shown, other embodiments are imaginable. So, it is possible that the projections are placed on the surface of a suitable formed mandrel via spiral series.

The invention is not limited to the embodiments described above, but can be varied widely within the scope of the invention.

I claim:

1. Device for removing the craw of slaughtered poultry, especially turkeys, comprising a rotatable mandrel adapted to be moved via the opening in the belly through the neck of the poultry and projections positioned thereon extending in the direction of rotation and the direction of motion of the mandrel, characterized in that each projection is provided with a blunt outer end defining the outer limitation of the device.

2. Device as set forth in claim 1, characterized in that the outer end of each projection is ballshaped.

3. Device as set forth in claim 1, characterized in that each projection tapers from its junction with the mandrel towards its transition to the blunt outer end.

4. Device as set forth in claim 1, characterized in that each projection comprises an inner section extending substantially radially and adjoining thereto an outer section carrying the blunt outer end and extending substantially tangentially.

5. Device as set forth in claim 1, characterized in that the projections are regularly disposed along the circumference of the mandrel.

6. Device as set forth in claim 5, characterized in that the projections are positioned in axial series disposed along the circumference of the mandrel.

7. Device as set forth in claim 6, characterized in that there are provided three axial series.

8. Device as set forth in claim 6 or 7, characterized in that each axial series comprises three projections.

9. Device as set forth in claim 1, characterized in that the mandrel is cylindrically shaped having a blunt rounded foremost end.

10. Device as set forth in claim 1, characterized in that the mandrel comprises three axially extending, mutually angles of 120° enclosing plates positioned in a star-shaped manner and rounded at the foremost end of the mandrel.

11. A device for removing the craw of slaughtered poultry, comprising:
 (a) a rotatable mandrel adapted to be moved through an opening in the body of the poultry and through the neck of the poultry, and having a rounded blunt end; and
 (b) a plurality of projections disposed on said mandrel, each extending in the direction of rotation of said mandrel, and each terminating with a blunt rounded outer end.

12. A device as set forth in claim 11, wherein said blunt rounded ends of said projections are spherical.

13. A device as set forth in claim 11, wherein each of said projections tapers from its junction with said mandrel towards said outer end.

14. A device as set forth in claim 11, wherein each of said projections comprises an inner section extending substantially radially and has adjoining thereto an outer section supporting said outer end and extending substantially tangentially.

15. A device as set forth in claim 11, wherein said projections are evenly disposed about said mandrel.

16. A device as set forth in claim 15, wherein said projections are positioned in axial series.

17. A device as set forth in claim 16, wherein said projections are disposed in three axial series.

18. A device as set forth in claim 16, wherein each of said axial series comprises three projections.

19. A device as set forth in claim 11, wherein said mandrel is cylindrical.

20. A device as set forth in claim 11, wherein said mandrel comprises three axially extending spaced enclosing plates.

* * * * *